US008075392B2

(12) United States Patent
Richardson

(10) Patent No.: US 8,075,392 B2
(45) Date of Patent: Dec. 13, 2011

(54) SLOT MACHINE GAME HAVING ROTATION OF SYMBOL AREA

(75) Inventor: Steven C. Richardson, Chicago, IL (US)

(73) Assignee: GC2, Inc., Arlington Heights, IL (US)

( * ) Notice: Subject to any disclaimer, the term of this patent is extended or adjusted under 35 U.S.C. 154(b) by 732 days.

(21) Appl. No.: 11/863,737

(22) Filed: Sep. 28, 2007

(65) Prior Publication Data

US 2009/0088242 A1 Apr. 2, 2009

(51) Int. Cl.
*G06F 17/00* (2006.01)
*G06F 19/00* (2006.01)
*A63F 9/24* (2006.01)
*A63F 13/00* (2006.01)

(52) U.S. Cl. ............ 463/20; 463/16; 463/25; 273/138.1

(58) Field of Classification Search .............. 463/16–20, 463/25, 29; 273/138.1, 139

See application file for complete search history.

(56) References Cited

U.S. PATENT DOCUMENTS 5,704,835 A * 1/1998 Dietz, II .......................... 463/20
6,062,978 A * 5/2000 Martino et al. ................... 463/9
6,315,663 B1 * 11/2001 Sakamoto ....................... 463/20
6,746,329 B1 6/2004 Duhamel
6,827,646 B2 12/2004 Adams
6,855,054 B2 * 2/2005 White et al. .................... 463/21
6,905,405 B2 * 6/2005 McClintic ....................... 463/16
6,908,381 B2 * 6/2005 Ellis ............................... 463/13
6,942,566 B2 9/2005 Baerlocher et al.
6,988,731 B2 1/2006 Inoue
7,100,916 B2 9/2006 Kelly et al.
7,371,170 B2 * 5/2008 Cregan et al. ................... 463/20
7,419,431 B2 * 9/2008 Gauselmann et al. .......... 463/30
7,465,230 B2 * 12/2008 LeMay et al. ................... 463/32
7,578,735 B2 * 8/2009 Frizzell et al. .................. 463/20
7,690,985 B1 * 4/2010 Muskin et al. .................. 463/20
7,731,580 B2 * 6/2010 Rothkranz ...................... 463/16
7,749,082 B2 * 7/2010 Dunaevsky et al. ............ 463/32
2003/0092480 A1 * 5/2003 White et al. .................... 463/20
2003/0104855 A1 6/2003 McClintic
2004/0033829 A1 * 2/2004 Pacey et al. ..................... 463/20
2004/0097280 A1 * 5/2004 Gauselmann .................. 463/16
2004/0162133 A1 8/2004 Jackson
2005/0054436 A1 3/2005 Frizzell et al.
2005/0119039 A1 6/2005 Berman et al.
2005/0143165 A1 * 6/2005 Berman et al. .................. 463/20
2005/0164764 A1 7/2005 Ghaly
2005/0164774 A1 * 7/2005 Gauselmann .................. 463/20
2005/0248086 A1 11/2005 Adams
2005/0288087 A1 12/2005 Meyer
2006/0009277 A1 1/2006 Hartl et al.

(Continued)

*Primary Examiner* — Milap Shah
(74) *Attorney, Agent, or Firm* — Lewis and Roca LLP

(57) ABSTRACT

A game system and method includes a symbol area having a plurality of symbols in a first orientation. The symbols in one or more pay lines may be compared to predefined payout patterns to determine a first payout. The symbols area and corresponding plurality of symbols may then be rotated to a second orientation or configuration. In the second orientation/configuration, the symbols in the one or more pay lines may be compared again to the predefined payout patterns to determine a second payout. Alternatively or additionally, a pay line and/or a payout pattern may change in response to the rotation. Rotation might only be activated if a rotation symbol is included in the plurality of symbols in the symbol area and/or in particular position in the symbol area. A player might also be permitted to pay for the ability to rotate the symbol area.

8 Claims, 13 Drawing Sheets

U.S. PATENT DOCUMENTS

2006/0046830 A1* 3/2006 Webb .............................. 463/20
2006/0160595 A1* 7/2006 Gerson et al. ................... 463/16
2006/0183532 A1* 8/2006 Jackson .......................... 463/20
2006/0247002 A1* 11/2006 Yoshimi et al. ................. 463/20
2007/0054727 A1 3/2007 Garamendi et al.
2007/0155470 A1 7/2007 Brunelle et al.
2007/0178965 A1 8/2007 Inoue
2008/0058060 A1* 3/2008 Okada ............................. 463/20
2008/0161095 A1* 7/2008 Patterson et al. ............... 463/20
2008/0300037 A1* 12/2008 Wilson ............................ 463/16

* cited by examiner

SLOT MACHINE GAME HAVING ROTATION OF SYMBOL AREA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to games of chance and video gaming machines. More specifically, the invention provides various methods and systems for a game of chance illustratively embodied in a video gaming machine, whereby the game may be based on an arrangement of symbols.

BACKGROUND

Gaming establishments (e.g., casinos) rely heavily on games and video gaming devices as a substantial source of income. In regulated gaming jurisdictions, e.g., Las Vegas, Nev., gaming regulations dictate the minimum levels that a video gaming device must payout, as a percentage of money wagered by players playing the machine, e.g., 90% minimum. Thus, if a machine is said to pay 95%, then the machine pays at least $0.95 in winnings for every $1.00 wagered in the machine. While the profit ratio appears slim, casinos principally rely on the volume of money played for profits. Because each video gaming machine can be considered a relatively fixed cost (maintenance and IP licenses represent minimal ongoing costs), the more money played in each machine, the more a casino's profits.

As the popularity of video games grows, and as more types of games are offered in the marketplace, video game/gaming developers must provide innovative types of games to maintain a player's interest in a given video gaming machine. Further, in order to maximize profit, casinos are continually seeking new and innovative games to keep players' interest, lest the player wander off into someone else's casino. Thus, there is a continual need in the art to provide new game play methods, bonuses, mini-games, payout methodology, and the like in video gaming devices to maintain player interest.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one or more aspects, a slot machine game is provided having a symbol area from which one or more payouts may be determined. The symbol area may include a matrix of N×M symbols determined from a plurality of symbols. A field of play may also be defined to identify the symbols within the symbol area that are in-play. The field of play may include a subset of less than all of the symbols included in the symbol area. A payout may be determined based on a comparison of an arrangement of symbols intersecting a pay line and one or more predefined payout patterns. That is, if an arrangement of symbols lying along a pay line matches a predefined payout pattern, a corresponding payout may be awarded to the player. In one or more configurations, a pay line might only intersect one symbol per column of symbols. Upon determining the first payout, the symbol area including the plurality of symbols may be rotated a specified amount (e.g., 90 degrees, 180 degrees, etc.) to a second orientation. In the second orientation, the plurality of symbols in the symbol area may be evaluated once more to determine a second payout based on the same or different pay lines and the same or different payout patterns. In one arrangement, the symbol area and the plurality of symbols might only be rotated if the plurality of symbols includes a rotation symbol. A rotation symbol may be any type of symbol. A symbol area and symbols included therein may be rotated any number of times and any number of payouts may be determined in accordance with the number of rotations.

To determine or select the symbols in a symbol area or symbol matrix, a slot game machine may spin or simulate the spinning of multiple vertical reels, each reel including multiple symbols. The reels may be stopped at a random point, after a default amount of rotation and/or an amount of rotation based on user input. Alternatively, the symbols may be determined for each position by rotating through and ultimately choosing one of a plurality of symbols for each position in the symbol matrix. A symbol may be determined or selected for each position based on an amount of time, a speed of rotation through the symbols and/or a time at which input is received from a player (e.g., when a player hits a "stop" button). In one or more arrangements, the plurality of symbols might not be determined or selected all at once. Rather, the symbols may be determined in a staggered fashion. In the example of reels or simulated reels, each reel may be stopped one after another. Various symbol determination or selection algorithms and methodologies may be used.

According to one aspect, different pay lines and payout patterns may be used depending on the rotational configuration of a symbol area. For example, if a plurality of symbols is initially configured in a 4×2 matrix and is subsequently rotated into a 2×4 matrix, the pay lines and payout patterns used for the second configuration may be different from those used in evaluating the first configuration. In particular, rather than having payout patterns requiring 4 symbols, payout patterns requiring 2 symbols may be used in the second configuration instead. Alternatively, generally horizontal pay lines might be used in the first configuration, whereas generally vertical pay lines might be used in the second configuration.

According to another aspect, symbol areas having non-square symbol or in-play matrices might only be allowed to rotate an amount such that the symbol matrix results in the same dimensions as the symbol matrix in the non-rotated orientation. Such a requirement may be put in place to insure compatibility of the symbol matrix arrangement with pay line requirements (e.g., a required number of symbols for proper comparison to a payout pattern). Alternatively, different pay lines and/or payout patterns may be used to evaluate a symbol matrix in a rotated orientation. For example, a payout pattern requiring a fewer number of symbols for proper comparison may be used. Accordingly, in such arrangements, the rotation amount might not be limited as described above.

According to another aspect, a slot machine game interface may include or specify a field of play identifying a subset of the symbols in a symbol area as being in-play. That is, symbols located within the field of play may be evaluated for payout purposes while symbols not within the field of play might not be so evaluated. Thus, a symbol area may include a 4×4 matrix of symbols while only a 4×2 matrix of the symbols are within the field of play. In such configurations, rotation of the symbol area may include rotating symbols into a field of play and rotating symbol out of the field of play.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
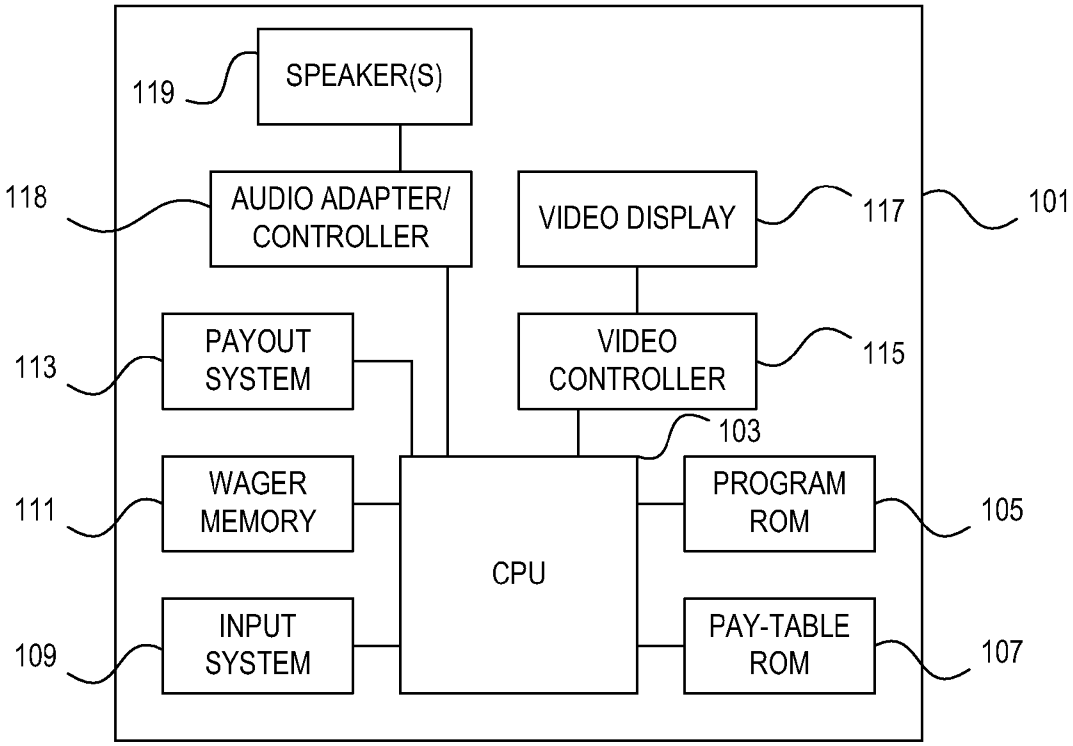
FIG. 1 illustrates an example of a hardware architecture in which one or more aspects of the invention may be embodied.

FIG. 1 provides an example of a hardware architecture in which one or more aspects of the invention may be embodied. Video gaming device 101 may be, in this example, a video slot machine, such as is found in any gaming jurisdiction. Video gaming device may include a CPU 103 controlling overall operation of the video gaming device based on instructions stored in program ROM 105 and pay-table ROM 107. Program ROM 105 stores executable instructions describing the behavior of the video gaming device, to be executed by CPU 103 to control operation of the video gaming device 101. Pay-table ROM 107 stores payout information based on various outcomes of the video gaming device.

CPU 103 may be connected to a video controller 115, which provides visual output to one or more video displays 117. CPU 103 may also provide audio output through one or more speakers 119 via an audio adapter or controller such as audio adapter/controller 11 8. Audio and video output may vary depending on the specific manner and method in which aspects of the invention are embodied in video gaming device 101, as will be appreciated upon reading further details below and with reference to the additional figures.

Input system 109 may include one or more buttons, toggles, switches, levers, coin/token slots, paper money/ticket receivers, magnetic card reader, touch-sensitive display screen(s) and the like, through which a player can deposit money into the video gaming device 101, review help and instructional information, select wager amounts, select pay lines, start a game, make selections during a game (e.g., in a bonus round), decide to cash out, etc. Wager memory 111 stores a current amount of money deposited by the player into the video gaming device 101, and may also store current wager information input by the player, e.g., number of lines played, bet per line, etc. Payout system 113 may include a coin/token dispenser, paper money/ticket dispenser, or any other device through which a user can withdraw money from video gaming device 101.

Video gaming device 101 is illustrative only. As used herein, the term "video gaming device" may refer to any data processing device, whether a computer, video slot machine, mechanical slot machine, mobile telephone, personal digital assistant, MP3 player, client-server architecture, and the like, on which a game of chance performing as described herein may be stored, implemented, and/or executed. For example, one or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, ROM, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
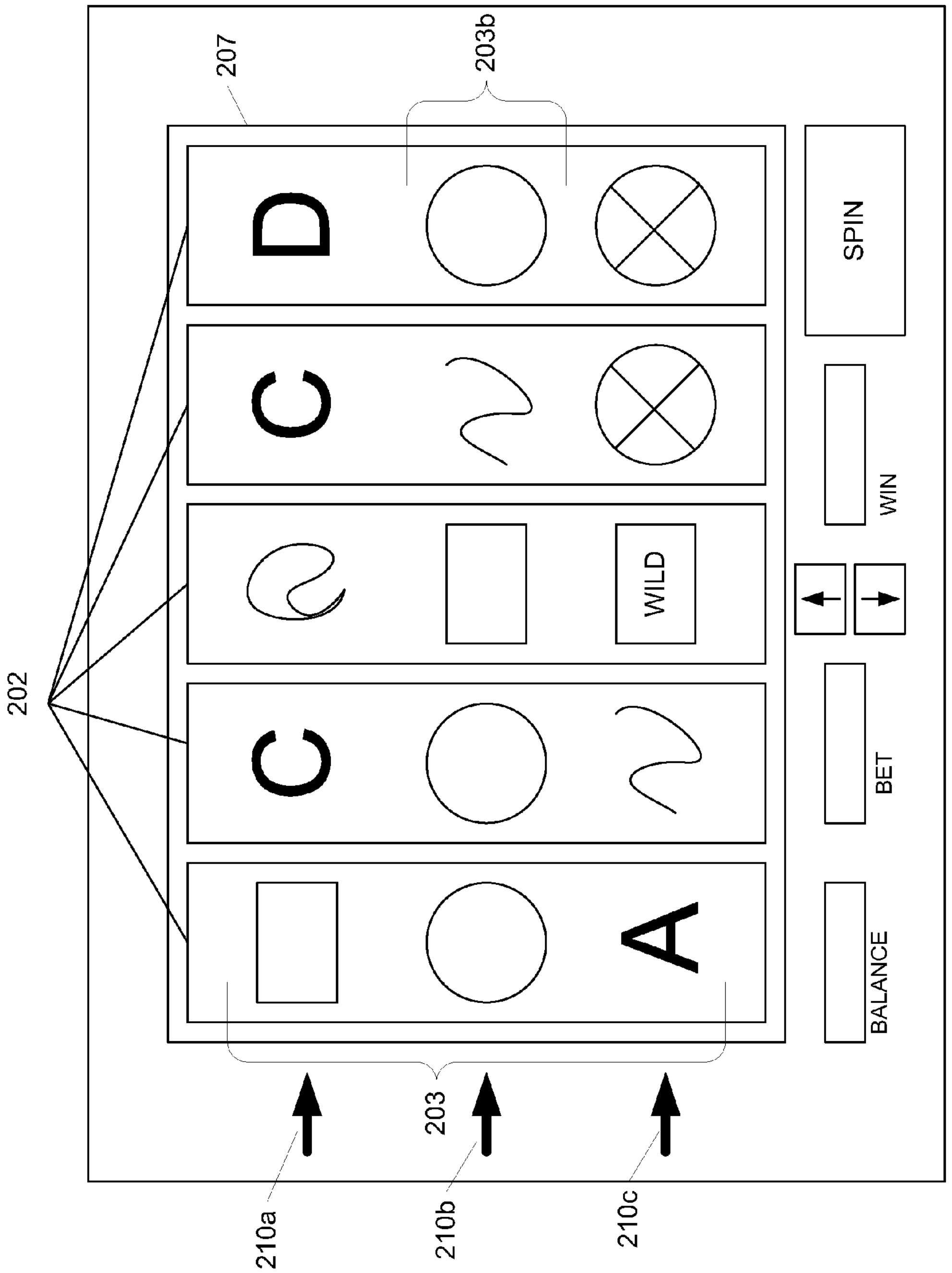
FIG. 2 illustrates a traditional slot machine interface.

In many gaming institutions, slot machines are often very popular. Traditional slot machines spin a predefined number of reels and determine a payout based on the types and static arrangement of symbols that appear within a predefined symbol area. In particular, predefined payout patterns may be used to evaluate whether a given row or line path of symbols corresponds to a winning arrangement. FIG. 2 illustrates a traditional slot machine having a plurality of reels 202 and a plurality of symbols 203 in a predefined symbol area 207. Pay lines 210 may be visually defined to identify to a player the relevant symbols being evaluated in determining a payout. A pay line, as used herein, refers to a line path that identifies the symbols used in determining a payout. For example, symbols 203*b* intersecting pay line 210*b* may be compared to a predefined payout pattern to determine whether a match exists. If so, a payout amount may be added to a player's balance. In some instances, a symbol orientation or arrangement (e.g., the order of symbols from left to right) may also be determinative of whether a match exists. Thus, while pay line 210*b* may match a predefined pattern, reversing the order of symbols 203*b* from left to right along pay line 210*b* might not be considered a match. Traditional slot machines also permit a player to selectively add and/or subtract the number of pay lines in play. The addition of more pay lines may cost more to play while reducing the number of pay lines may reduce the cost. As the cost to play changes, so may the payout.

As discussed, current slot machines only evaluate a static arrangement of symbols along one or more pay lines to determine a payout. Aspects described herein, however, provide for methods and systems of determining a payout based on multiple symbol arrangements along one or more pay lines. In one example, a set of symbols in a symbol area may be initially evaluated along one or more static pay lines to determine a first payout. Subsequently, the set of symbols may be rotated 90 or 180 degrees (i.e., the entire symbol area may be rotated) without altering the configuration of the pay lines to determine a second payout. Thus, a player may have multiple opportunities to increase their payout. Additionally, the opportunity to rotate or reconfigure the symbols in the symbol area might only be available if one or more specified symbols appear in the symbol area.

In some arrangements where one or more static pay lines require a predefined number of symbols, a set of symbols or a symbol area might only be rotated 90 degrees if the set of symbols or symbol area is a square arrangement (i.e., an N×N symbol arrangement) to insure that a compatible number of symbols correspond to the one or more pay lines after rotation. Other ways for manipulating the symbol area or the symbols included therein may also be used as alternatives to or in combination with the methods described herein.

Figure 3A:
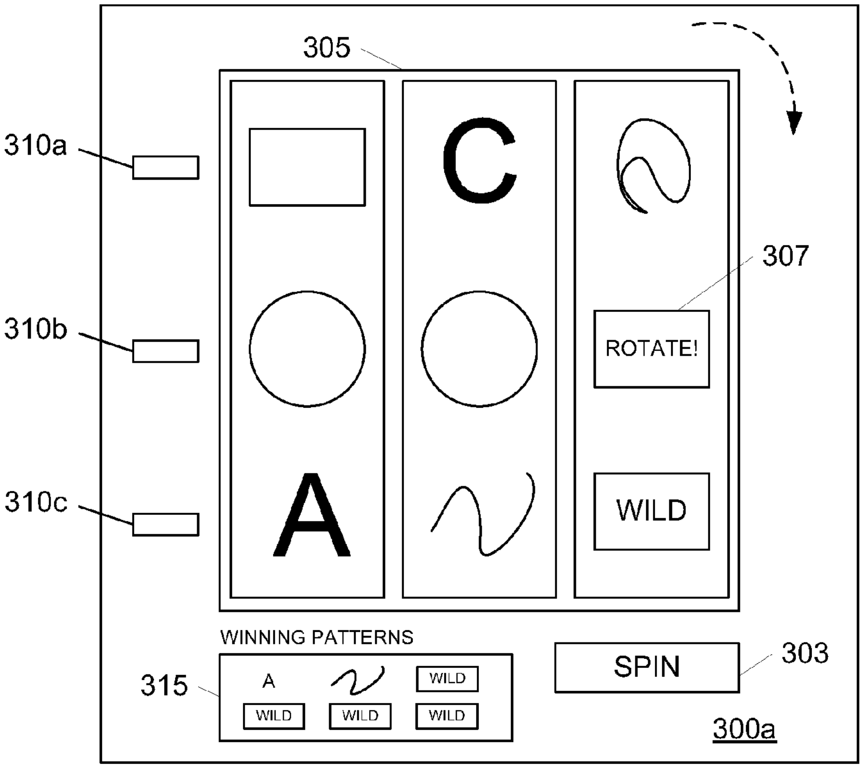
FIGS. 3A-C illustrate a series of slot game machine interfaces according to one or more aspects described herein.
Figure 3B:
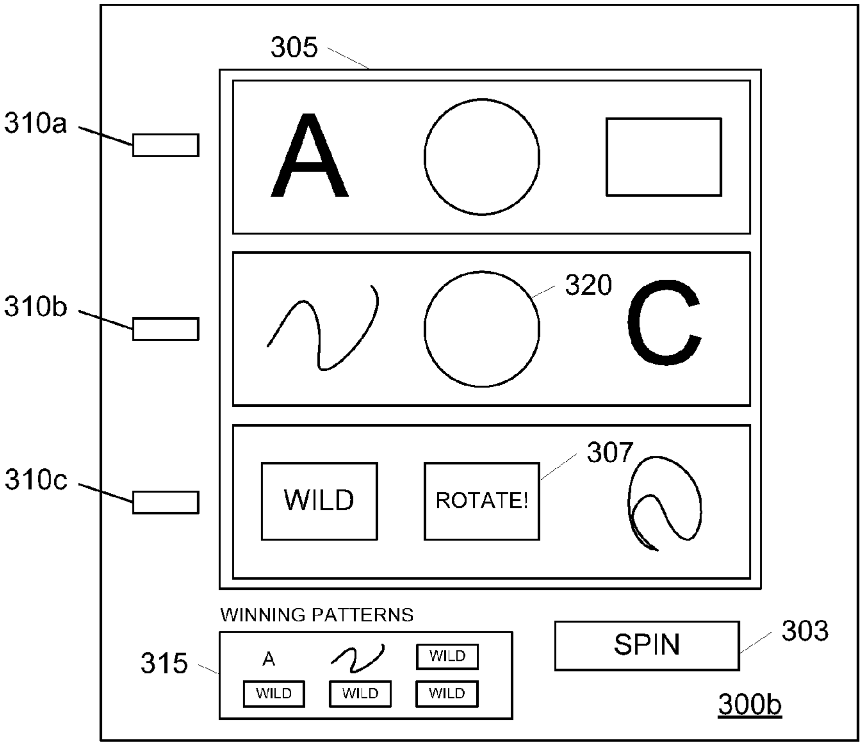
Figure 3C:
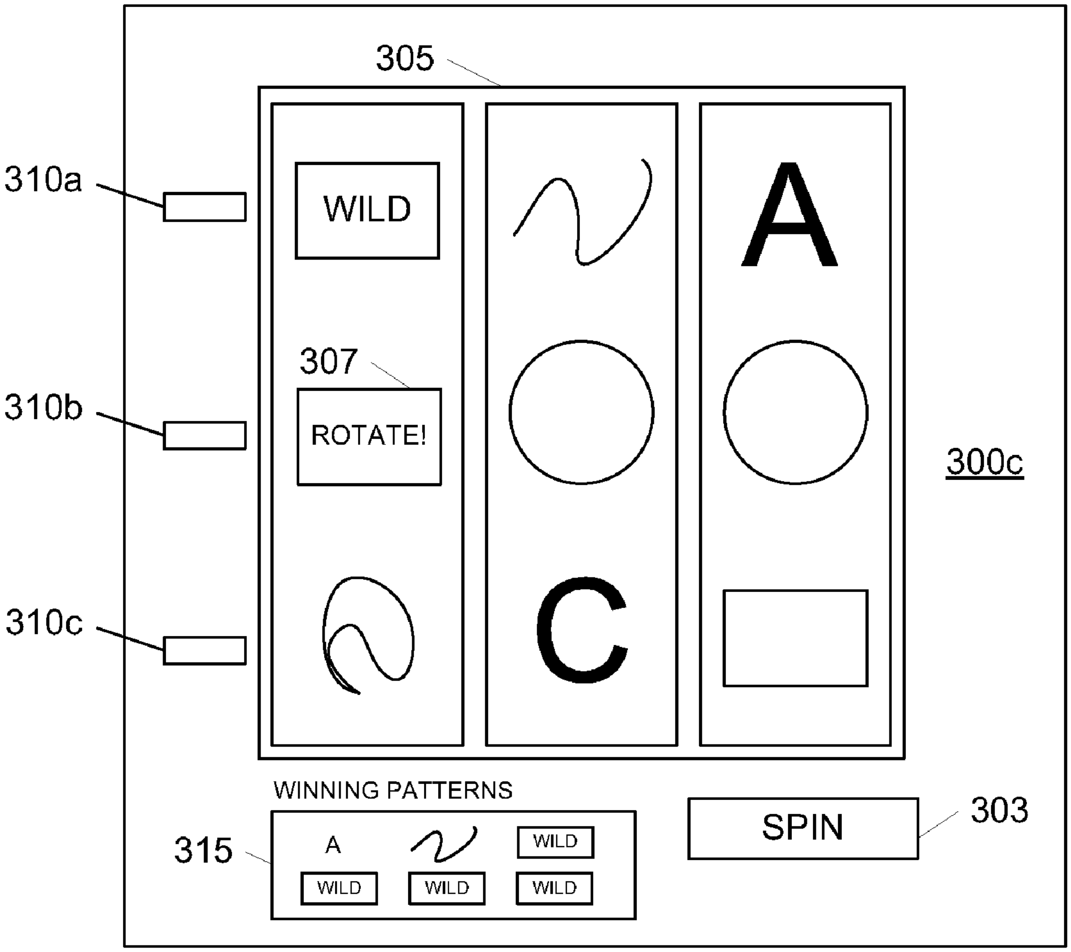

FIGS. 3A-C illustrate a transition between three slot machine interfaces according to various aspects described herein. In FIG. 3A, a slot machine interface 300*a* may include symbol area 305 that is defined by a 3×3 matrix of symbols corresponding to 3 vertical reels. After a player elects to spin the reels, e.g., using spin/stop button 303, the reels may come to rest in the arrangement shown in FIG. 3A. In particular, after the player spins the reels, symbol area 305 may include a designated rotation symbol 307 indicating that a player may rotate the symbol area 305 including the symbols therein for a second opportunity to increase their payout. In one or more configurations, if designated rotation symbol 307 does not appear within symbol area 305 after a spin, rotation of the symbol area 305 (and a second payout opportunity) might not be permitted. Additionally or alternatively, rotation symbol 307 may be required to be in a particular location or position to enable rotation. Pay line indicators 310 may be used to visually identify the symbols, combination of symbols and order of symbols being evaluated to determine a first payout. Pay line indicators, e.g., indicators 310*a* and 310*b*, may be differentiated by color, shape, size and the like. Possible winning payout patterns 315 may be shown in a portion of the user interface as a reference for the player. If a pay line, e.g., the pay line corresponding to indicator 310*a*, matches a winning payout pattern, the symbols along the pay line may be visually distinguished. For example, the symbols may be highlighted, flashed and/or a visual representation of the winning pay line may be displayed (not shown).

Upon determining a first payout, a slot machine may then rotate the symbols clockwise in symbol area 305 by a predefined amount about a predefined point. For example, in FIGS. 3A-C, the rotation may occur about middle symbol 320. Thus, middle symbol 320 will generally remain in the same position regardless of the amount of rotation. FIG. 3B illustrates slot machine interface 300*b* after the symbols in symbol area 305 have been rotated by 90 degrees about symbol 320. The configuration and orientation of pay lines 315, however, may remain static (i.e., might not change). In this second orientation (i.e., the 90 degree rotated orientation), a second payout may be determined by the slot machine by again evaluating the arrangement of symbols corresponding to each of pay lines 310. Because, in this second orientation, the symbols corresponding to pay lines 310 may have changed due to the rotation of the symbols in symbol area 305, a player may have a second opportunity to match one or more payout patterns 315.

After determining the second payout, the slot machine may further rotate the symbols in symbol area 305 by another 90 degrees (i.e., for a total of 180 degrees from the original or first orientation). The configuration and orientation of pay lines 315 may again remain static. FIG. 3C illustrates slot machine interface 300*c* with symbol area 305 after the rotation. The slot machine may further determine a third payout based on the symbols corresponding to pay lines 315 in the third orientation. The amount of rotation (e.g., 90 degrees, 180 degrees, etc.), number of rotations and number of payout opportunities may vary depending on user preferences, preferences of a gaming institution or predefined parameters.

Figure 4:
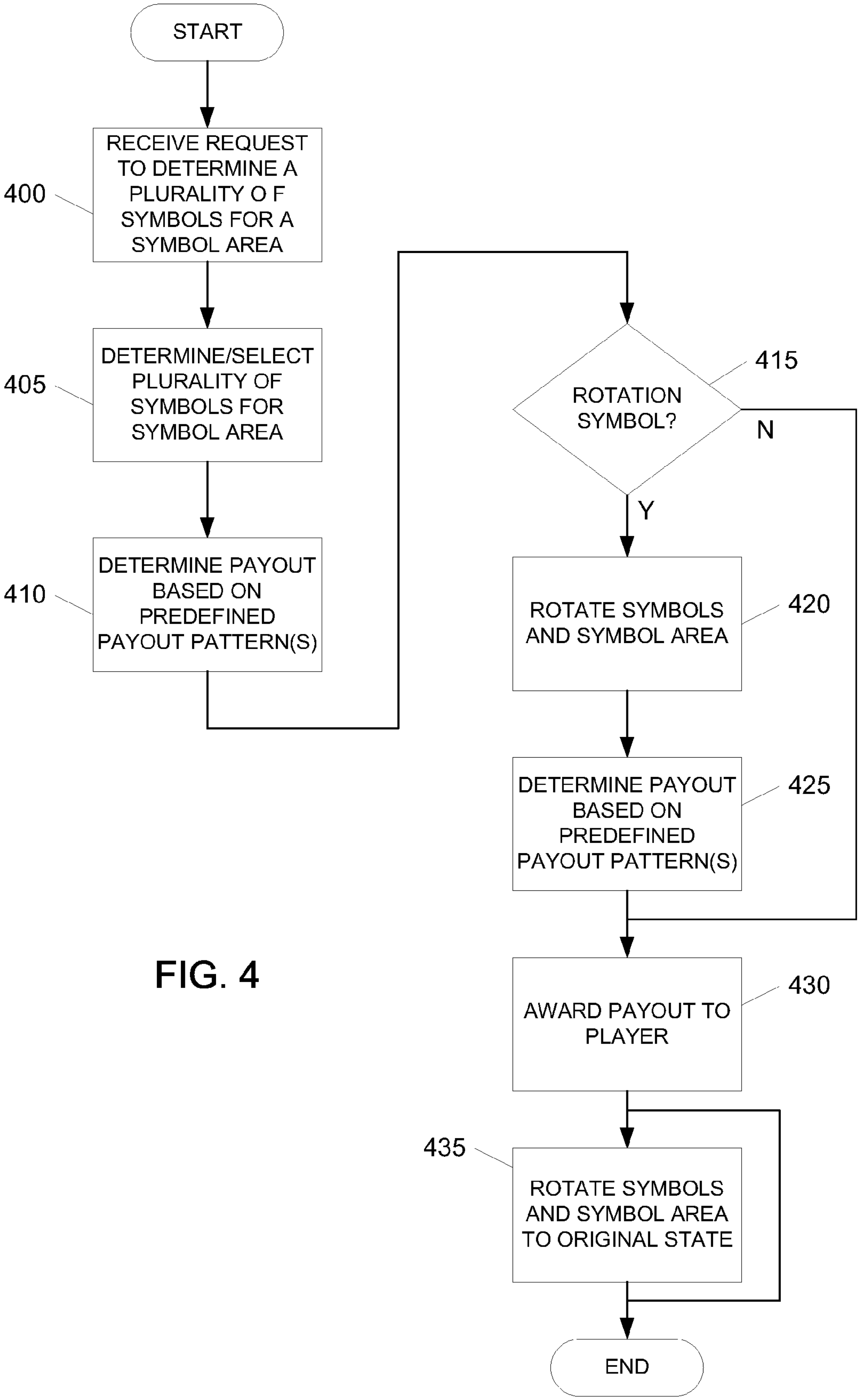
FIG. 4 is a flowchart illustrating a method for playing a slot machine game and for determining a payout according to one or more aspects described herein.

FIG. 4 is a flowchart illustrating a method for determining a slot machine payout based on a plurality of symbol orientations. In step 400, for example, a slot machine may receive user input corresponding to a request to determine or select a plurality of symbols for a predefined symbol area. The user input may, for instance, correspond to a request to spin a plurality of reels that each includes a plurality of symbols. Alternatively or additionally, the user input may correspond to a request to begin a rotation through a plurality of symbols in each position of the symbol area. In step 405, the slot machine may determine a plurality of symbols for the predefined symbol area. Such a determination may be made, for example, based on a randomization algorithm that randomly selects a symbol for each of the positions in the symbol area. The determination may further be based on a time at which further user input is received corresponding to, e.g., a player hitting a stop button (e.g., to stop a spin of or rotation through the symbols). Once the symbols in the symbol area have been determined/selected, the slot machine may determine a first payout based on symbols in a pay line and one or more predefined payout patterns in step 410. For example, the symbols along a predefined pay line may be compared to a payout pattern to determine whether a match exists. If a match exists, a payout corresponding to the payout pattern may be awarded to the player.

Once the first payout has been determined, the slot machine may further determine whether the symbol area includes a rotation symbol in step 415. A rotation symbol may be any symbol designated as providing a rotation opportunity. If a rotation symbol is included in the symbol area, the slot machine may rotate the symbols in the symbol area in step 420. The amount of rotation may vary so long as the resulting arrangement provides a number of symbols along each pay line compatible with a required number of symbols for each pay line. The rotation amount may be user-selectable, predefined by the slot machine and/or randomly or pseudo-randomly selected. Upon rotating the symbols in the symbol area, the slot machine may determine a second payout for the same pay lines using this second arrangement of symbols (i.e., the rotated arrangement) in step 425. The determination of a second payout may follow the methods and systems described above with respect to steps 410 and 415. The second payout may then be awarded to the player in step 430.

Once the second payout has been determined, the symbols in the symbol area may optionally be rotated or returned back to their initial arrangement and positions to begin another game, if necessary, in step 435. If the symbols were not rotated (e.g., because the symbol area did not include a rotation symbol), rotation back to the original or initial arrangement might not be needed. It is to be understood that the symbols in the symbol area and/or the symbol area itself may be rotated any number of times depending on the configuration of the game and/or preferences of a player. Further, a payout may be determined for each rotation. For example, if a symbol area includes two rotation symbols, the player may be entitled to two rotations of the symbols (i.e., resulting in two additional opportunities to increase their payout).

Figure 5A:
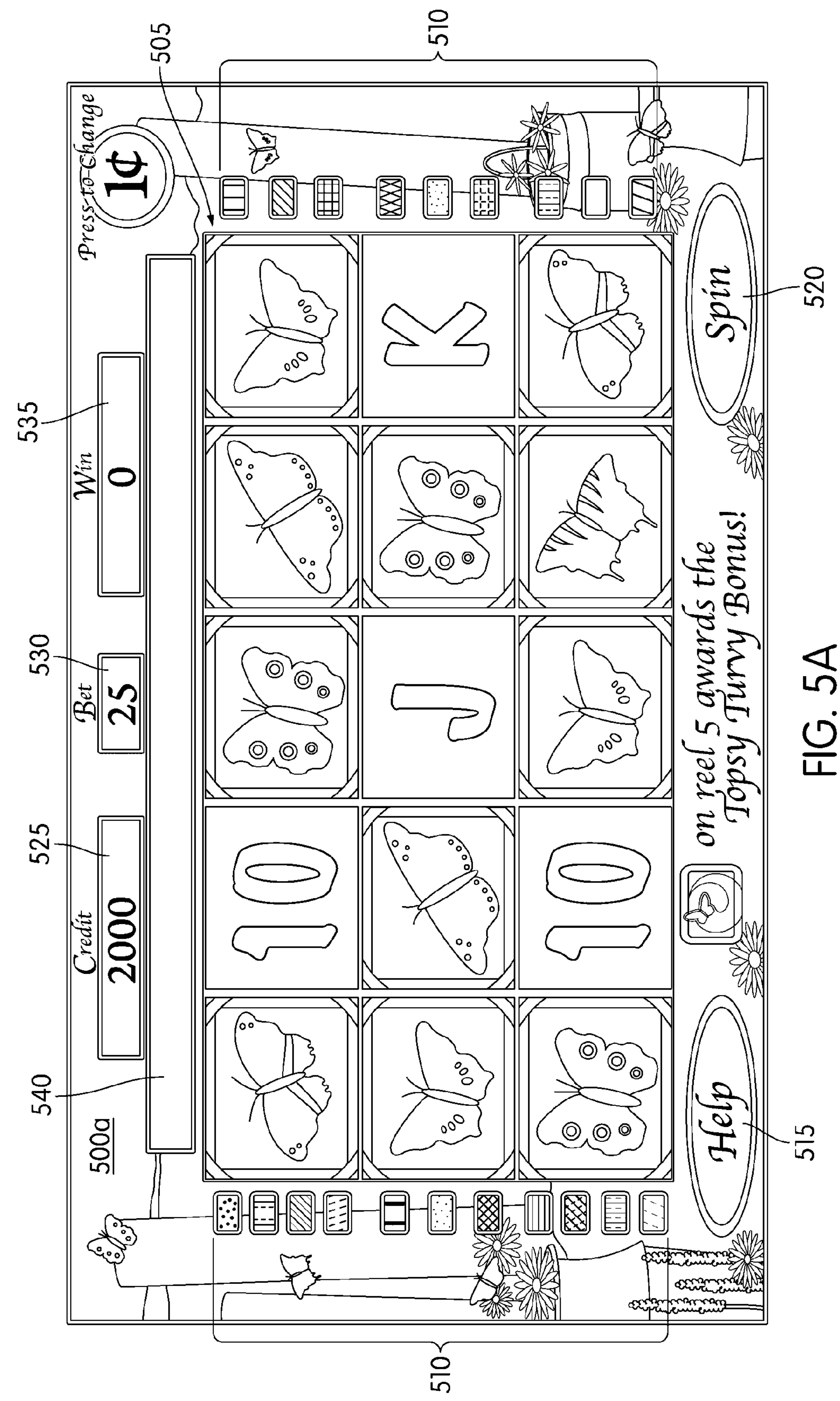
FIGS. 5A and 5B illustrate a series of interfaces showing a before and after spin state.

FIG. 5A illustrates a slot machine interface 500*a* including symbol area 505, pay line indicators 510, help option 515, spin/stop option 520, available credit indicator 525, wager indicator 530 and payout amount indicator 535. Interface 500 may further include information bar 540 that may display various messages such as encouraging messages, helpful hints, game status information and the like. Spin/Stop option 520 may change in appearance depending on a current mode of the game. That is, when a player selects spin/stop option 520 prior to the beginning of a game (e.g., during a wager phase), spin/stop option 520 may read "Spin." When a player selects the spin/stop option 520 when it reads "Spin," the reels may begin spinning and/or each symbol position in symbol area 505 may begin rotating through symbols. In such a spin mode, spin/stop option 520 may change to read "Stop," to allow a player to designate a point at which to stop spinning or rotating through symbols or to skip any animations being performed by the slot machine.

Figure 5B:
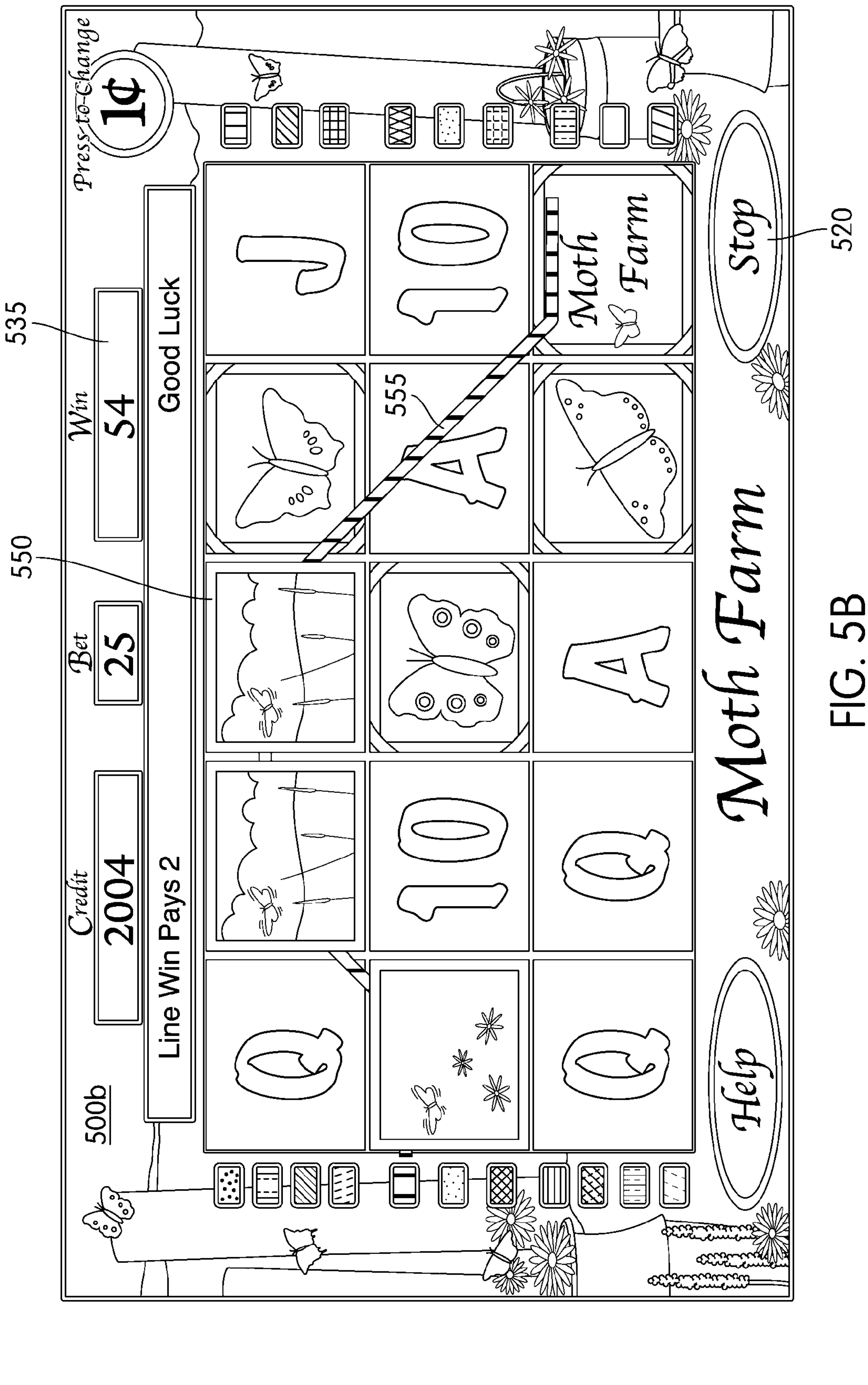

FIG. 5B illustrates slot machine interface 500*b* in spin mode with spin/stop option 520 reading "Stop." Slot machine interface 500*b* further includes identification of a winning pay line using a combination of symbol highlighting, e.g., highlighting 550, and line connections, e.g., line connection 555. Payout amount indicator 535 may further be altered to reflect the reward amount for the winning pay lines.

Figure 6A:
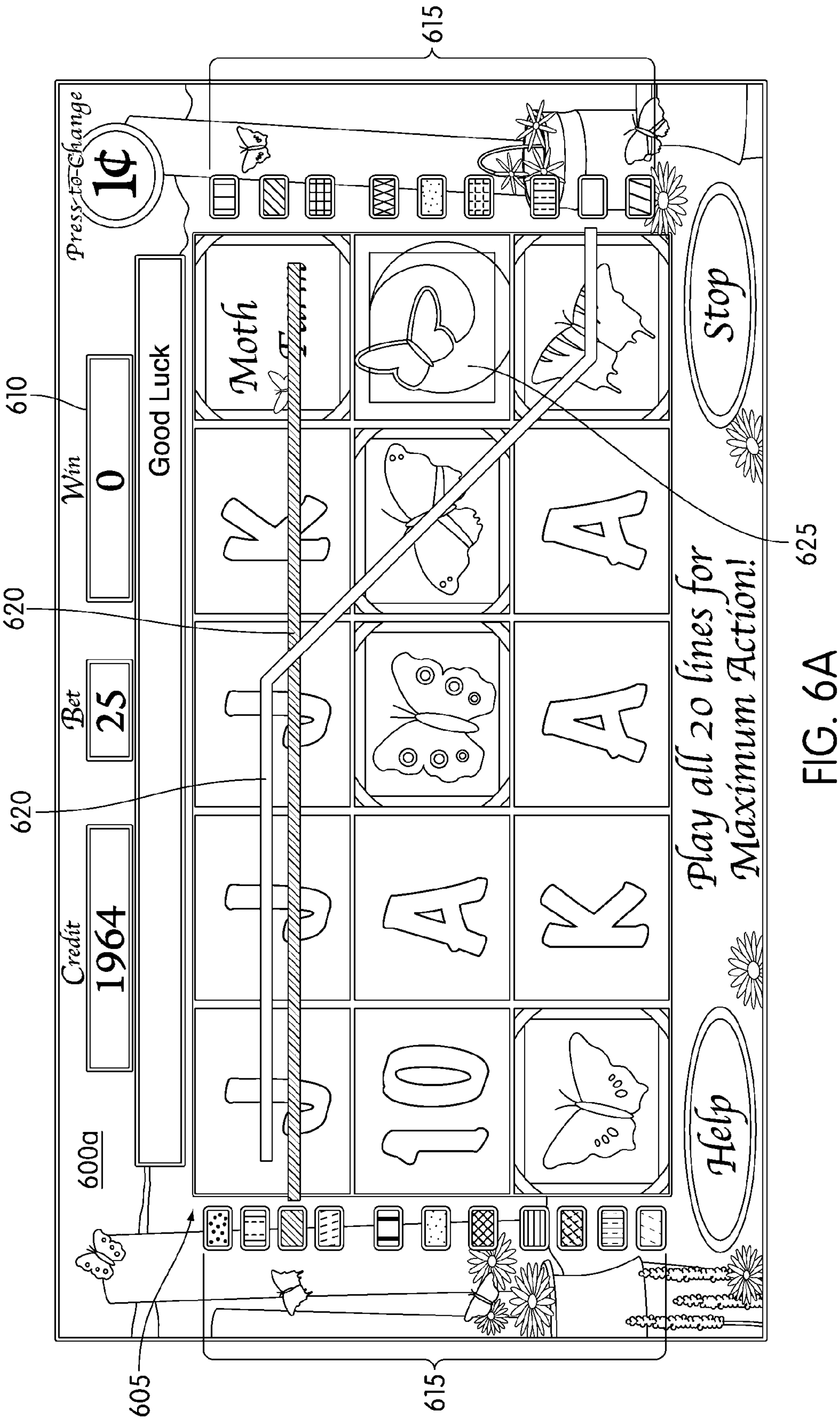
FIGS. 6A and 6B illustrate a series of interfaces showing a symbol area in a first arrangement and a symbol area in a rotated second arrangement according to one or more aspects described herein.
Figure 6B:
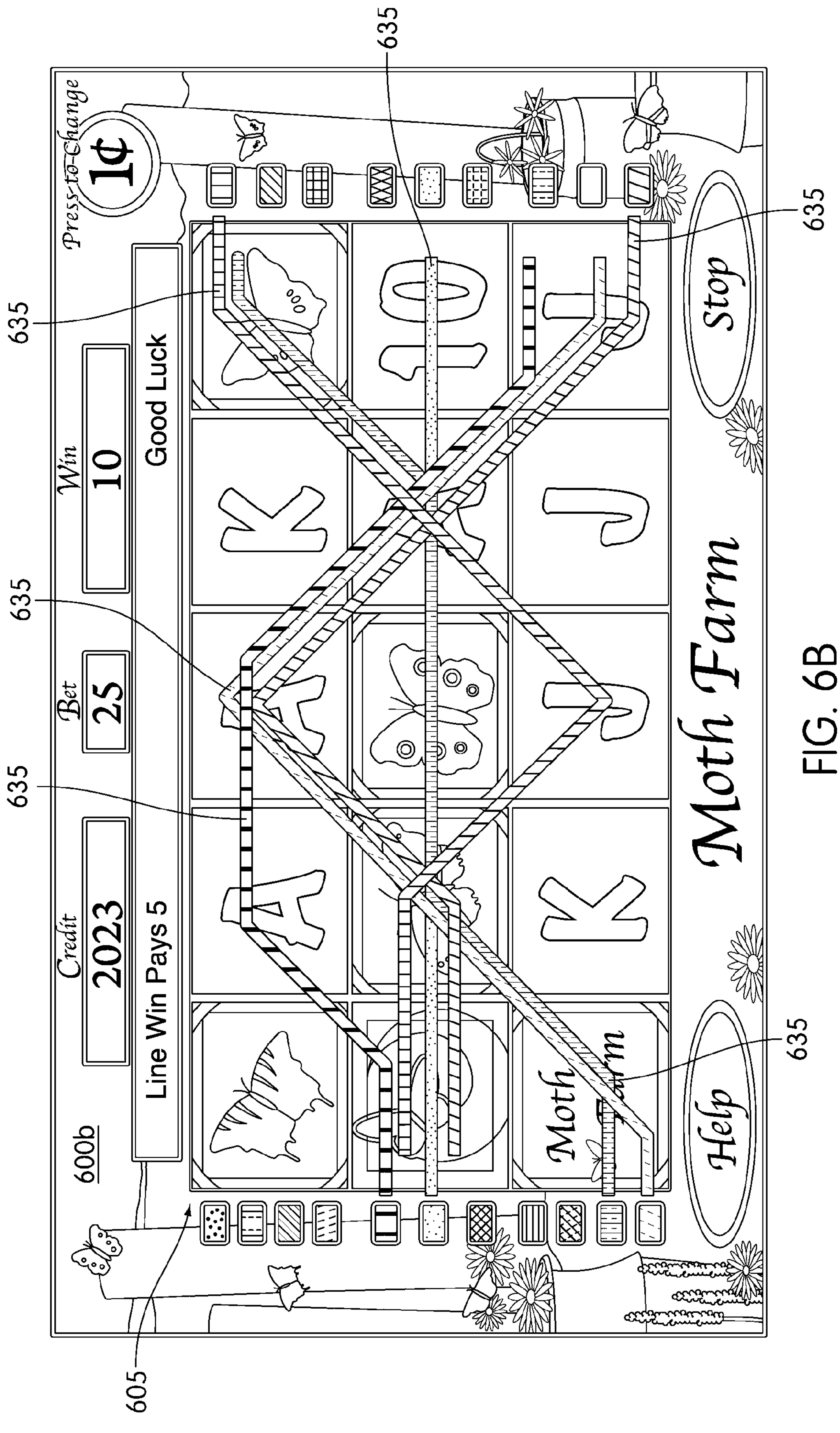

FIGS. 6A and 6B illustrate a transition between a first arrangement of symbols and a rotated second arrangement of symbols in game interfaces 600*a* and 600*b*, respectively. In FIG. 6A, symbol area 605 includes a 5×3 matrix of symbols determined upon a player initiating a game (e.g., spinning the reels). A payout amount shown in payout amount indicator 610 is determined based on pay lines matching one or more predefined payout patterns (not shown). Winning or matching pay lines, e.g., pay lines 615, may be highlighted or identified by lines 620 that intersect the symbols matching the payout pattern(s). Each of lines 620 may be visually differentiated (e.g., by color and/or pattern) so that a player may more easily identify different winning combinations of symbols. In FIG. 6A, symbol area 605 further includes rotation symbol 625, the presence of which, in symbol area 605, gives the player another opportunity to increase his or her payout. The additional opportunity is provided by rotating the symbol area (and thus, the symbols) by a predefined amount and reevaluating the pay lines for matches with payout patterns.

FIG. 6B illustrates game interface 600*b* upon rotating symbol area 605 and symbols contained therein 180 degrees. Winning pay lines in the rotated configuration are identified by lines 635 intersecting the winning arrangement(s) of symbols. A payout amount might not be calculated until after a player has had an opportunity to view all of the winning pay lines. In one or more embodiments, since the symbols and symbol area 605 are rotated 180 degrees, the orientation of each symbol, upon rotation, may be corrected such that the symbols are not upside-down or otherwise incorrectly oriented.

Figure 7A:
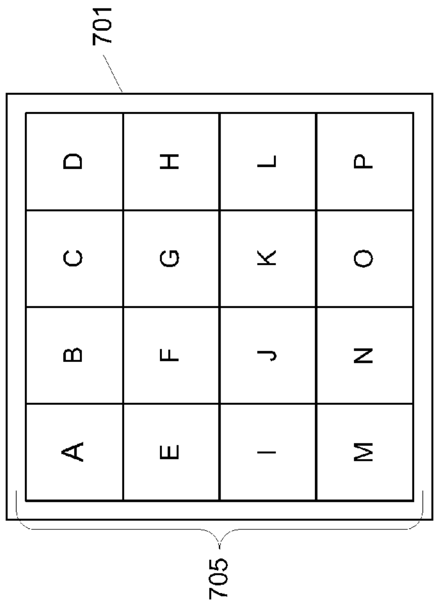
FIGS. 7A-D illustrate a square symbol matrix and possible rotational configurations thereof.
Figure 7B:
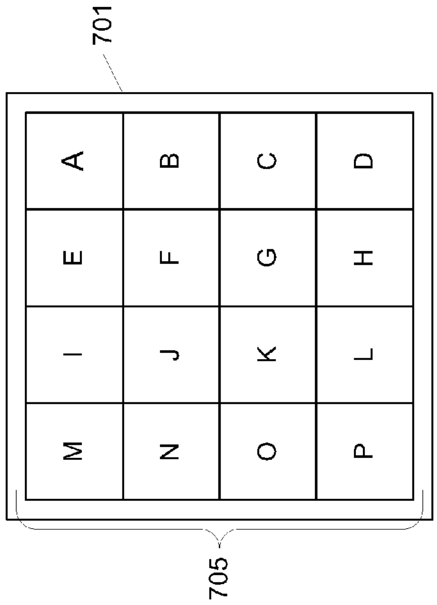
Figure 7C:
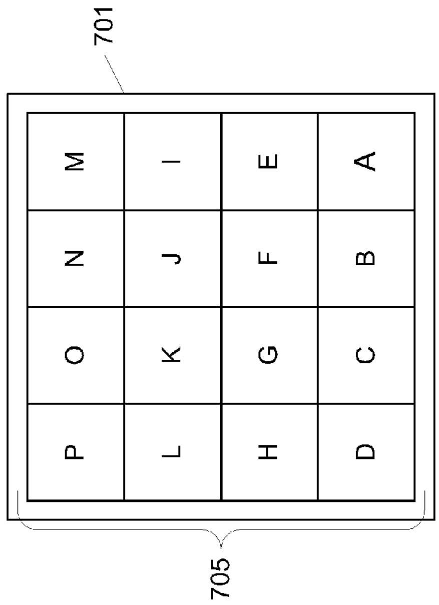
Figure 7D:
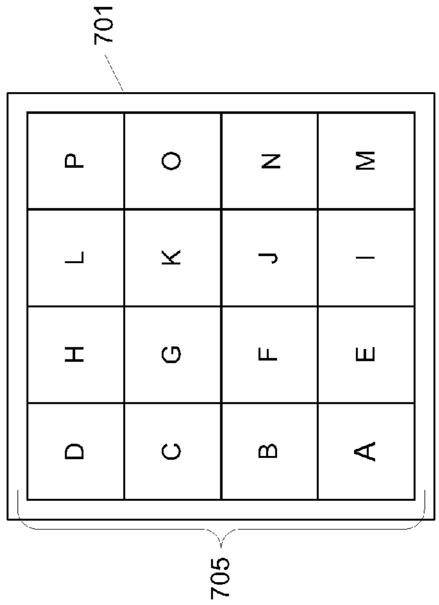

FIGS. 7A-D illustrate a square 4×4 symbol matrix and various rotational configurations thereof. In FIG. 7A, symbol area 701 including the square 4×4 symbol matrix is shown with symbols 705 in a first, non-rotated configuration. FIG. 7B illustrates symbol area 701 and symbols 705 in a second configuration where symbol area 701 and symbols 705 have been rotated clockwise by 90 degrees. Each of FIGS. 7C and 7D illustrate symbol area 701 and symbols 705 in third and fourth configurations, respectively. In the third configuration, symbol area 701 is rotated clockwise an additional 90 degrees resulting in a total rotation of 180 degrees from the first non-rotated configuration. The fourth configuration is a result of rotating the symbol area 701 and symbols 705 of FIG. 7C yet another 90 degrees. That is, the fourth configuration illustrates symbol area 701 and symbols 705 after a total clockwise rotation of 270 degrees (or counter clockwise rotation of 90 degrees) from the first non-rotated configuration.

Figure 8B:
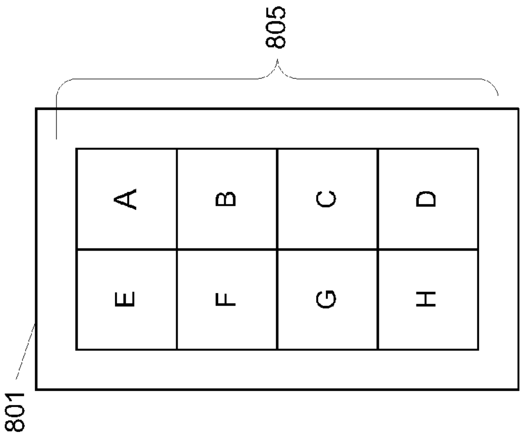
FIGS. 8A-D illustrate a non-square symbol matrix and possible rotation configurations thereof.
Figure 8D:
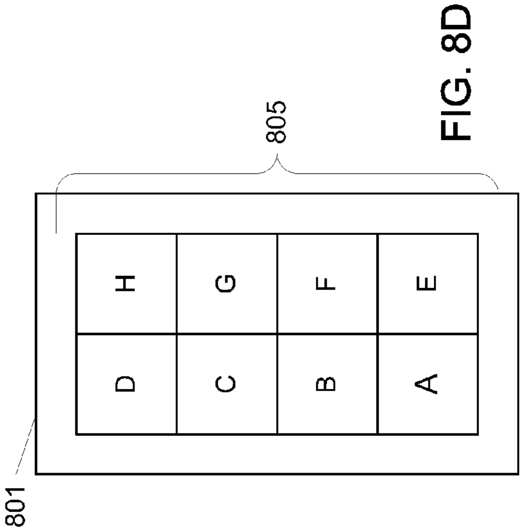
Figure 8A:
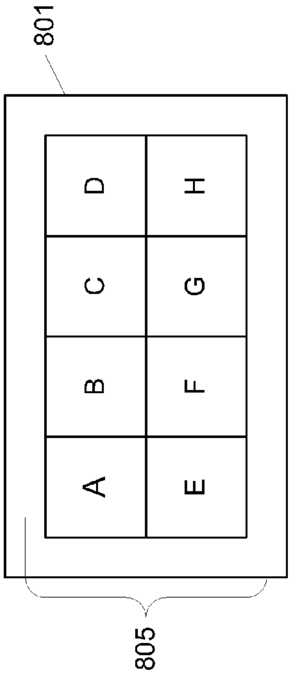
Figure 8C:
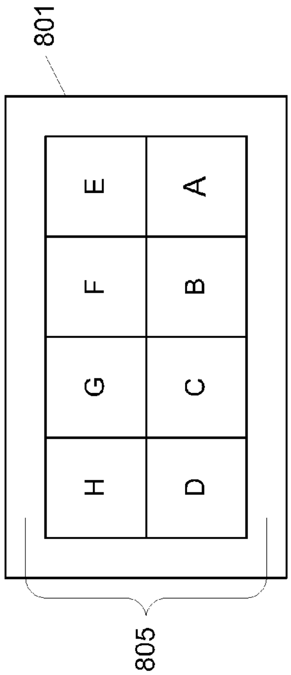

FIGS. 8A-8D illustrate a 4×2 symbol matrix and various rotational configurations thereof. In FIG. 8A, symbol area 801 and symbols 805 included therein are shown in a first non-rotated configuration. FIG. 8C illustrates symbol area 801 and symbols 805 after a clockwise rotation of 180 degrees from the first non-rotated configuration of FIG. 8A. FIGS. 8B and 8D illustrate symbol area 801 and symbols 805 rotated clockwise 90 degrees and 270 degrees, respectively, resulting in a change from a 4×2 symbol matrix to a 2×4 symbol matrix. In some embodiments where a pay line and/or a payout pattern requires a specific number of symbol columns, such rotations (i.e., rotations of 90 and 270 degrees) might not be permitted for non-square symbol matrices. However, in some arrangements, where pay lines and/or payout patterns may change to compensate for changes in the size of the symbol matrix, such rotations of 90 and 270 degrees may be permitted. In one example, a first set of payout patterns may be used in evaluating symbols 805 in the 4×2 matrix configuration while a second set of payout patterns may be used to evaluate symbols 805 in the 2×4 matrix configuration. The first set of payout patterns may each require an arrangement of 4 symbols while the second set of payout patterns may each require an arrangement of 2 symbols.

Figure 9A:
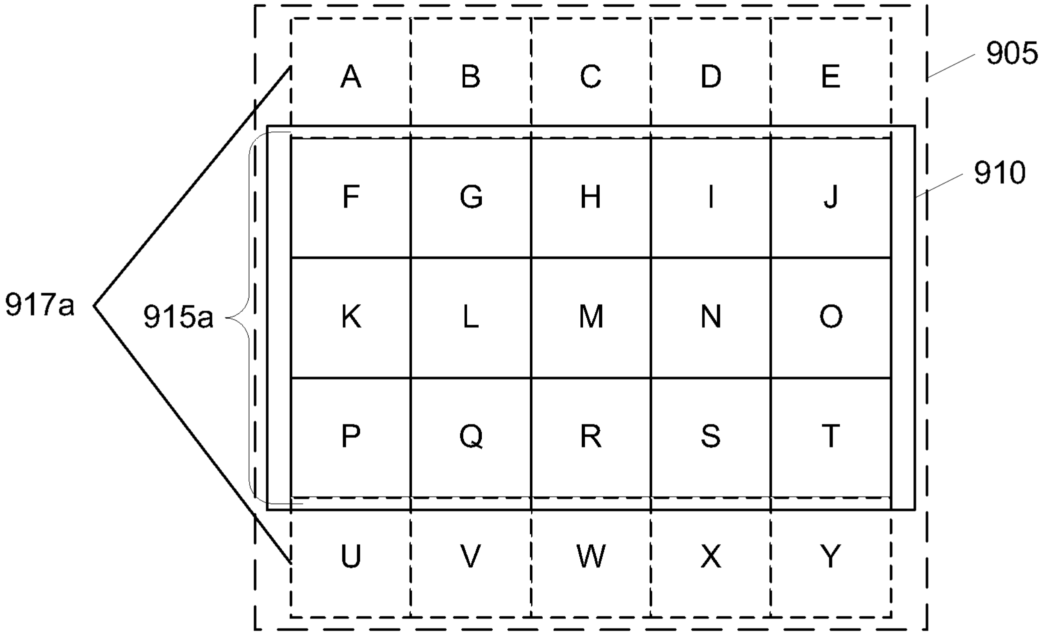
FIGS. 9A-D illustrate a game configuration wherein symbols initially out-of-play are brought into play when rotating the symbol area.

In one or more arrangements, a field of play may be defined as a subset of the symbols in a symbol area (i.e., instead of using the entire symbol area in the field of play). That is, only a subset of less than all of the symbols in an area might be considered in-play at any one time. FIGS. 9A-9D illustrate a game configuration in which field of play 910 is used to identify symbols in symbol area 905 that are considered in-play. In-play symbols may be defined as symbols located within a field of play and which will be evaluated for purposes of determining a payout. In contrast, an out-of-play symbol may refer to symbols that are not considered in determining a payout and/or that are not within a field of play (e.g., field of play 910). FIG. 9A, for example, illustrates a subset of symbols 915*a* located within field of play 910 and remaining symbols 917*a* located outside field of play 910. Thus, while symbol area 905, as a whole, includes a square 5×5 matrix of symbols, field of play 910 might only define a 5×3 symbol matrix as being in-play.

Figure 9B:
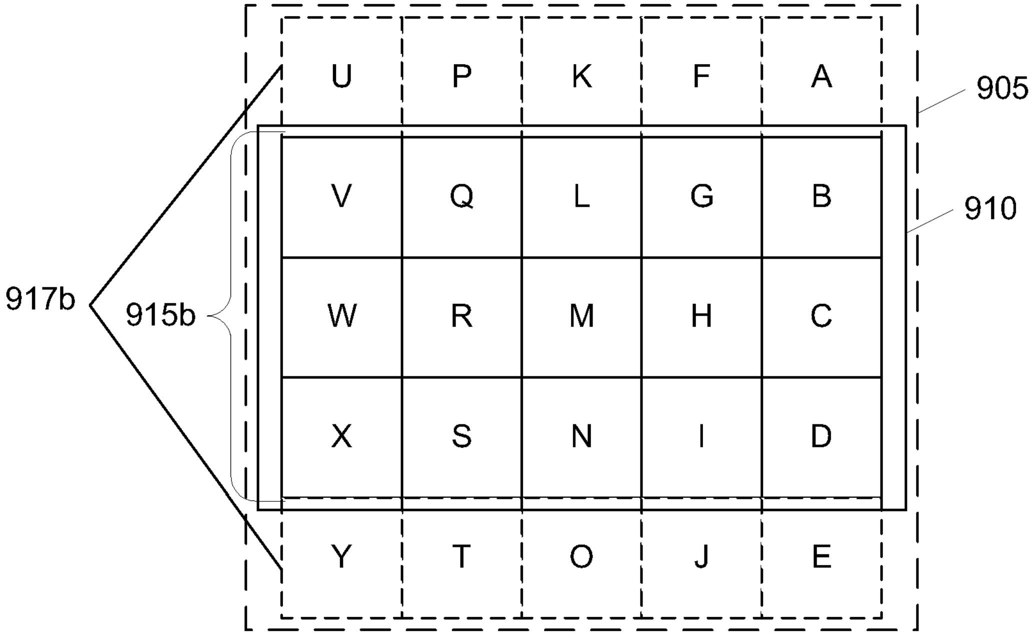
Figure 9C:
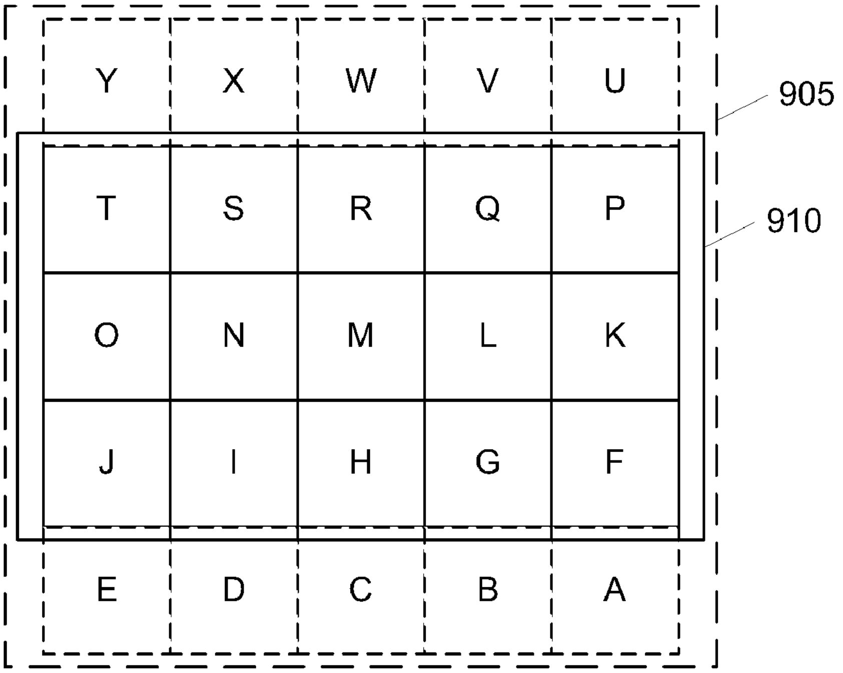
Figure 9D:
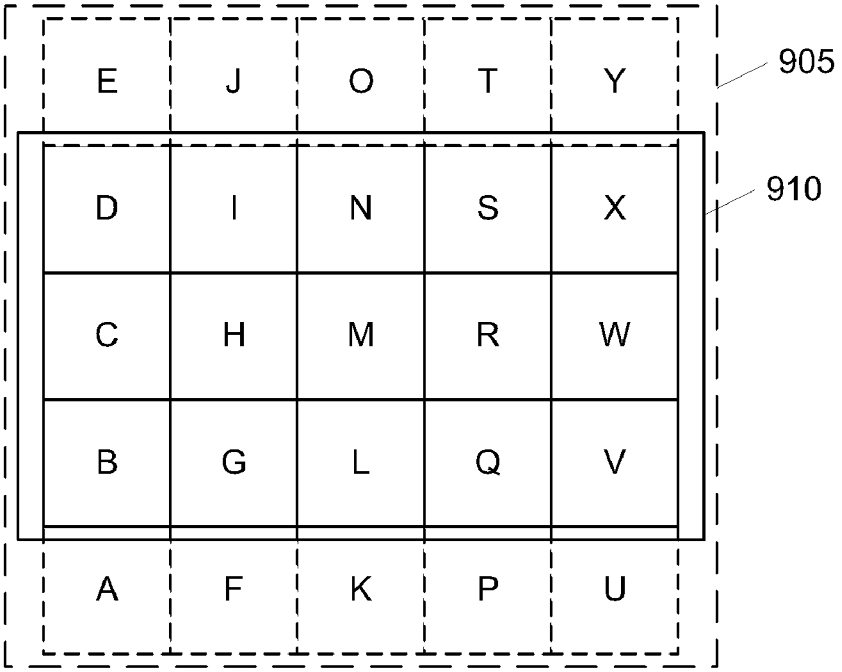

Despite the in-play matrix of symbols being non-square, symbol area 905 and the in-play symbol matrix may be rotated 90 degrees while maintaining the same pay lines and field of play configuration. This may be possible by rotating one or more out-of-play symbols (e.g., symbols 917*a*) into play to replace the one or more in-play symbols 915*a* rotated out of play. FIG. 9B illustrates symbol area 905, field of play 910, out-of-play symbols 917*b* and in-play symbols 915*b*, upon rotating symbol area 905 by 90 degrees. Symbols F, K, P, J, O and T that were once in-play have been rotated out of play and symbols B, C, D, V, W and X, which were once out of play, have now been rotated into play to fill in the positions previously occupied by symbols F, K, P, J, O and T. Thus, pay lines that require a row of 5 symbols may still be used despite field of play 910 including a non-square matrix of symbols. FIGS. 9C and 9D illustrate symbol area 905 and field of play 910 rotated 180 degrees and 270 degrees, respectively, from the initial non-rotated configuration.

Although the rotation of symbol areas and symbols has been described herein in terms of clockwise rotations, counter clockwise rotations may also be used. Further, the opportunity to rotate a symbol area may be triggered, alternatively or additionally, by an added or extra payment. That is, a player may purchase the ability to rotate the symbol area regardless of whether the determined symbols in the symbol area include a rotation symbol. In addition, any size or dimension of symbol or symbol area may be used in accordance with the aspects described herein.

In one or more embodiments, in addition to providing the opportunity to rotate the field of play, a rotation symbol may also act as a wild card symbol. A wild card symbol may act as any symbol thereby increasing a player's chance of matching one or more predefined payout patterns.

Additionally or alternatively, while the aspects described herein relate generally to horizontal pay lines, vertical pay lines may also be defined and used in evaluating a matrix of symbols. Further, pay lines may change from a horizontal configuration to a vertical configuration in response to a rotation of a symbol matrix or symbol area. For example, in instances where new or out-of-play symbols are brought into play when a symbol area is rotated, existing horizontal pay lines may rotate with the symbol area and/or vertical pay lines may be used instead of or in addition to the horizontal pay lines. Other pay line configurations (e.g., diagonal pay lines) may also be used in accordance with the aspects described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An apparatus comprising:

a processor; and a memory configured to store computer readable instructions, that when executed by said processor, cause the apparatus to perform a method comprising:

receiving a request from a player to determine a plurality of symbols in a first configuration in a symbol area;

in response to the request, determining the plurality of symbols and displaying the plurality of symbols in the symbol area;

determining whether a first payout has been won based on a comparison of the plurality of symbols in the first configuration with one or more predefined payout patterns, wherein the one or more predefined patterns are fixed with respect to the symbol area;

rotating the displayed plurality of symbols of the first configuration by 90 degrees in a single step to determine a second configuration of the plurality of symbols in the symbol area;

determining whether a second payout has been won based on a comparison of the plurality of symbols in the second configuration with the one or more predefined payout patterns; and awarding the player the first payout only if it has been won and the second payout only if it has been won.

2. The apparatus of claim 1, further comprising:

rotating the displayed plurality of symbols of the second configuration a further 90 degrees in a single step to determine a third configuration of the plurality of symbols in the symbol area; and determining a third payout based on a comparison of the plurality of symbols in the third configuration with the one or more predefined payout patterns.

3. The apparatus of claim 1, wherein the symbol area is a matrix of symbol positions and determining the plurality of symbols in the first configuration includes determining a symbol for each symbol position in the matrix.

4. The apparatus of claim 1, wherein the one or more predefined payout patterns are order dependent.

5. The apparatus of claim 1, further comprising determining whether the plurality of symbols in the first configuration includes a rotation symbol and only rotating the displayed plurality of symbols symbol of the first configuration to the second configuration when the rotation symbol is present in a predefined location.

6. One or more non-transitory computer readable media storing computer readable instructions that, when executed by a processor, cause the processor to perform a method comprising:

receiving a request from a player to determine a plurality of symbols in a first configuration in a symbol area;

in response to the request, determining the plurality of symbols and displaying the plurality of symbols in the symbol area in the first configuration;

determining whether a first payout has been won based on a comparison of the plurality of symbols in the first configuration with one or more predefined payout patterns, wherein the one or more predefined patterns are fixed with respect to the symbol area;

rotating the displayed plurality of symbols of the first configuration by 180 degrees in a single step to determine a second configuration of the plurality of symbols in the symbol area;

determining whether a second payout has been won based on a comparison of the plurality of symbols in the second configuration with the one or more predefined payout patterns; and awarding the player the first payout only if it has been won and the second payout only if it has been won.

7. The one or more non-transitory computer readable media of claim 6, further comprising instructions for determining whether the plurality of symbols in the first configuration includes a rotation symbol and only rotating the displayed plurality of symbols of the first configuration to the second configuration if the rotation symbol is present in a predefined location.

8. The one or more non-transitory computer readable media of claim 6, wherein the symbol area is a matrix of symbol positions and determining the plurality of symbols in the first configuration includes determining a symbol for each symbol in the matrix.

* * * * *